United States Patent Office 3,256,216
Patented June 14, 1966

3,256,216
FLAME AND HEAT RESISTANT PHENOLIC
RESIN CELLULAR MATERIALS
Paul N. Erickson, Birmingham, and Albert N. Erickson, Detroit, Mich., assignors to Evans Products Company, Plymouth, Mich., a corporation of Delaware
No Drawing. Filed Nov. 5, 1962, Ser. No. 235,560
17 Claims. (Cl. 260—2.5)

This invention relates to compositions for forming cellular phenolic resin materials having improved flame and heat resistance and to a method of forming a family of such cellular resin bodies having a wide range of pre-determined densities.

Heretofore, it has been known that phenolic cellular materials may be prepared from acid-curing thermosetting liquid phenolic resins by adding to such resins an acid catalyst and a material which will liberate gas during the heat generating acid-curing step, for example, materials such as those which, upon reaction with acid, liberate carbon dioxide or materials which volatilize at elevated temperatures such as the low boiling ether solvents and the like. While the cellular material products of certain of the heretofore known processes are capable of self-extinguishment of a flame after the igniting flame is removed, others of them continue to burn and all of the known materials are susceptible to flameless decomposition when subjected to temperatures above about 300° F. for longer than short periods of time.

It is the primary object of this invention to provide products comprising cellular phenol-aldehyde resins which have remarkably improved flame resistance and substantial improvement in resistance to flameless decomposition from sustained high temperature heat.

Another object of this invention is to provide a method for forming the improved cellular phenol aldehyde products of this invention; to provide a method which employs a modified acid catalyst which enables the formulation of compositions having pre-determined pot life, including substantially longer pot life so as to substantially increase the handleability and utility of such compositions for a greater variety of end uses.

Other objects and advantageous features of this invention will become apparent upon considering the following detailed description of this invention in its entirety.

In accordance with this invention it has been found that aluminum chloride added to an aqueous mass of flowable, acid-curing thermosetting phenol-aldehyde condensation product functions both as a catalyst in generating heat and aiding foaming and curing as well as conferring on the resultant cellular product greatly improved flame resistance, self-extinguishing properties and ability to withstand flameless decomposition at higher temperatures. The above and related objects may be accomplished by the use of a composition containing, in parts by weight:

FORMULATION I

| | Parts by wt. |
|---|---|
| Phenol aldehyde resin | 100 |
| Aluminum chloride | 1–100 |
| Volatilizable hydrocarbon | 0–24 |
| Wetting agent | 0–10 |
| Mineral acid catalyst (e.g., 37% HCl aqueous solution) | 1–15 |

A preferred composition for the purposes of this invention contains, in parts by weight:

FORMULATION II

| | Parts by wt. |
|---|---|
| Phenol formaldehyde resin | 100 |
| Aluminum chloride·6H$_2$O | 15–50 |
| Volatilizable hydrocarbon | 6–18 |
| Wetting agent | 1–4 |
| Mineral acid catalyst (e.g., 37% HCl aqueous solution) | 7–14 |

A composition which exhibits substantially longer pot life and yet forms the improved heat and flame resistant compositions of this invention contains, in parts by weight:

FORMULATION III

| | Parts by wt. |
|---|---|
| Phenol formaldehyde resin | 100 |
| Aluminum chloride·6H$_3$O | 20–50 |
| Volatilizable hydrocarbon | 6–18 |
| Wetting agent | 1–4 |
| Mineral acid catalyst (e.g. 37% HCl aqueous solution) | 1–6 |

Then phenol aldehyde resin which is useful for the purposes of this invention is a foam forming resin which is flowable or pourable under normal temperature and pressure conditions, and is a composition which contains an aqueous acid-curing thermosetting liquid phenolic resin, the resin being an A-stage resinous product of partial reaction of ingredients comprising a phenol and an aldehyde. The term "a phenol" is intended to include phenol, and similar materials such as m-cresol, resorcinol, 3,5-xylenol, and mixtures thereof. The aldehyde may be any of the aldehydes which is conventionally used for reactions with phenol to produce A-stage reaction products such as formaldehyde, furfural, mixtures thereof, etc., with formaldehyde being preferred. The ratio of formaldehyde to phenol is preferably in the range of about 1:1 to about 1.6:1, but higher quantities of formaldehyde up to about 3:1 may be used. The resinous material may be prepared by conventional techniques such as those disclosed in U.S. Patents 2,218,373, issued October 15, 1940, and 2,446,429, issued August 3, 1948, but should contain at least about 55% solids.

The most preferred form of phenol aldehyde resin is the partial reaction product of phenol and formaldehyde using a conventional catalyst such as barium hydroxide, the reaction being continued past the phenol-alcohol stage, and the reaction product thereafter dehydrated to a water content not in excess of about 10% by weight, as determined by the Carl Fisher method, and which product is soluble in at least an equal weight of water. The water soluble phenol formaldehyde resins such as those described in U.S. Patents 2,034,457 and 2,190,672 may also be used, preferably dehydrated to the above specified amount. The dehydrated resin products may satisfactorily have a viscosity, at 25° C. in the range of about 600 to about 30,000 cps., but preferably have a visocsity in the range of about 600 to 10,000 cps. The phenol formaldehyde resins, of the above described type, which are susceptible to degradation by heat above about 75° F. with time, may be used in the fresh condition or may satisfactorily be employed even though they have heat aged from the initial preferred viscosity range to a viscosity in the range of 5,000 cps. to 60,000 but preferably not exceeding about 30,000 cps. Such heat-aged, higher viscosity resins are more difficult to foam, and the formation of lightweight foams from such resins, or mixtures thereof with lower viscosity fresh or partially heat-aged resins requires the use of proportions of volatilizable hydrocarbon and/or wetting agent which approach the upper limits for those components set forth above in Formulation I, in accordance with the disclosure set forth in copending application Serial No. 235,561, filed November 5, 1962, now abandoned, which application is owned by the assignee of this application.

As above generally indicated, the aluminum chloride constituent confers on the cellular product the unexpected property of greatly increasing the flame resistance, as well as the resistance to deterioration of the cellular product to sustained high temperatures. The aluminum chloride constituent also confers on the cellular product the ability to snuff out or stop flaming, or an enhancement of the self-extinguishing characteristics of an otherwise similar cellular product which does not include the aluminum chloride ingredient. It is preferred to use aluminum chloride which is hydrated, i.e., $AlCl_3 \cdot 6H_2O$. Although the reason for the enhancement of the flame and heat resistance is not positively known, it is thought that at least part of the aluminum chloride is present in the cellular foamed product in a chemically unchanged form, uniformly distributed throughout the foam, and when a flame is applied to the cellular product the aluminum chloride decomposes to form oxygen excluding gases which serve to prevent the initiation of a flame. Cellular foam containing aluminum chloride in small quantites shows definite improvement in ability to resist initiation of flame, and at the preferred concentrations, the cellular product resists flaming even when an oxy-acetylene torch flame is directed on the surface for a short time while somewhat less intense flames, such as propane or butane torch flames are resisted for extended time periods. When the aluminum chloride is hydrated, evidence is at hand which indicates that the $AlCl_3$ eliminates its water of hydration since it has been observed with certain compositions that droplets of water appear on the surface as the temperature is increased, such as, for example, by the application of a butane or propane torch flame directly to the surface of the cellular material.

It has also been observed that aluminum chloride functions as a catalyst and works in conjunction with the mineral acid catalyst to aid foaming of the composition upon mixing at room temperature. Compositions which contain as little as 1%, by weight of the aqueous phenol-aldehyde condensate, of a mineral acid catalyst such as 37% HCl, do not foam to form useful lightweight cellular material, but such compositions will foam and produce cellular materials when the larger proportions of aluminum chloride from Formulation I are present in conjunction with such a small quantity of acid solution catalyst. It is to be understood that aluminum chloride is much less active in causing the volatilizable hydrocarbon to volatilize since it reacts with the aqueous constituents of the resinous composition much more slowly than the mineral acid catalyst and thus forms less heat. For this reason, it is possible to formulate compositions which exhibit much longer pot life than compositions intended to form lightweight foams which contain only a mineral acid catalyst and yet the density of the ultimately formed cellular product is substantially identical to that which is obtainable from the use of a larger proportion of mineral acid catalyst in the absence of the aluminum chloride. For even longer pot life, lowering the temperature below normal room temperature to 20° F.–40° F. during mixing and thereafter is desirable. As the heat forming reaction between the aqueous resin condensate and the mineral acid catalyst begins, a portion of the aluminum chloride component apparently decomposes to form additional HCl which functions to further catalyze and assist the foaming reaction. A preferred formulation of this type is above set forth in Formulation III, which contains sufficient aluminum chloride to function jointly as heat and flame resistance imparting constituent as well as a catalyst in effecting foaming of the composition.

Any of the mineral acids will function satisfactorily to catalyze the foaming reaction but non-oxidizing acids such as sulfuric, hydrochloric and phosphoric represent the preferred types of acid for use in this invention. Hydrochloric acid represents the most preferred acid since it causes foaming at lower concentrations than sulfuric or phosphoric and yet forms compositions having suitably long pot life for most commercial purposes. Hydrochloric and phosphoric acid mixtures are especially satisfactory where the best self-extinguishing characteristics are desired in the cellular product. The proportion of mineral acid which should be used is a function of the viscosity of the resin being employed as well as the density of the finally desired cellular product. In general, the amount of acid catalyst should be increased within the above defined range as the viscosity of the resin increases, and for a given viscosity of resin an increase in the amount of mineral acid catalyst which is added generally decreases the density of the resultant cellular product. The proportions of mineral acid catalyst which are set forth above in Formulations I, II and III as percent by weight of the resin refer to 37% HCl aqueous solutions and proportions of other acids or mixtures thereof which are to be used should be selected on the basis of ability to produce an equivalent heat generation to that which is formed by the there specified quantities of 37% HCl.

The improved cellular products of this invention are formed by merely mixing the above described ingredients rapidly and completely and providing a suitable container to permit the composition to rise freely. Normally, the generation of sufficient heat to initiate the volatilization of the volatilizable component occurs fairly rapidly after the ingredients are uniformly mixed but pot life can be compositions containing the preferred quantities of acid extended from 1 to 3 minutes which is characteristic of catalyst set forth in Formulation II to 5 to 30 minutes by using lower quantities of acid catalyst, higher quantities of aluminum chloride and maintaining the temperature of the mixture below room temperature. By varying the quantities of volatilizable component, wetting agent and catalyst the speed of the foaming reaction can be controlled and products of pre-determined density prepared to satisfy a wide range of specific commercial applications The final densities may be varied between about ½ and about 50 lbs. per cubic ft. It has been noted, however, that as the proportion of acid catalyst is decreased and dependence is placed on the aluminum chloride to assist in the foaming of the composition, there is a tendency for the foaming mass to collapse and fall, or shrink from the sides of the container toward the end of the foaming reaction. This condition is believed to be due to the deficiency of generated heat to complete the cure of the thermosetting phenolic resin to its infusible and insoluble state and in these cases it is desirable to supply additional heat during the foaming. This may be achieved by causing the foaming to occur within an oven or by the addition of heat to the sides of the container in which the foaming reaction takes place. In those cases in which pot life is not critical, shrinkage of the foamed material may be prevented by slightly increasing the quantity of acid catalyst in the composition.

The volatilizable hydrocarbon which is suitable for use is an aliphatic ether having a boiling point between about 30° C. and 100° C. which is represented by the formula ROR′, wherein R and R′ each represent the same or a different alkyl group having up to 4 carbon atoms. Excellent results have also been obtained from the use of methylene chloride as the volatilizable hydrocarbon and it has been found that methylene chloride is somewhat more voltailizable than the aliphatic ethers, volume for volume, and has more power or ability to successfully effect foaming of resinous compositions containing the higher viscosity resinous materials. Methylene chloride produces unexpectedly uniform cellular products and is preferred for use as the volatilizable hydrocarbon in the compositions of this invention. Aliphatic ethers having boiling points falling within the above specified range which are specifically suitable for use in the practice of the present invention include isopropyl methyl ether, methyl propyl ether, ethyl propyl ether, ethyl isopropyl ether, diisopropyl ether, di-n-propyl ether, diethyl ether, tertiary butyl ethyl ether, n-butyl ethyl ether, n-butyl methyl ether, and ethyl isobutyl ether. It is permissible to mix the above ethers, and to mix the ethers with methylene chloride and such mixtures are particularly desirable for use in connection with the higher viscosity resins. It has also been noted that the use of the lower boiling point ethers, or mixtures thereof with methylene chloride are most capable of forming lightweight foams from the higher viscosity resins or mixtures thereof. The amount of the volatilizable hydrocarbon which should be employed is dependent both upon the initial viscosity of the phenol aldehyde resin being used and the desired final density of the cellular product. In general, it may be stated that as the viscosity of the resin increases the density of the resulting cellular foam decreases for a given quantity of volatilizable hydrocarbon which is used, and where heat-aged resins having a viscosity exceeding about 5,000 cps. are used, solely, or in admixture with lower viscosity resins, it is usually necessary to employ quantities of volatilizable hydrocarbon above about 12%, by weight of the resin, when lightweight foams in the range of 1 to 10 lbs. per cubic ft. are desired. As the viscosity of the resin decreases, the quantity of volatilizable hydrocarbon may also be decreased and uniform lightweight foams having a density in the range of about 0.2 to 5 lbs. per cubic foot are satisfactorily formed by using a proportion of volatilizable hydrocarbons in the range of about ½% to 8%, by weight of the resin.

The wetting agent functions to assist the formation of uniform pores during foaming and a number of surface active materials have been found to be satisfactory for the purpose of this invention. The surface active agents comprising the polyethylene ethers of sorbitan monoester of a fatty acid containing from 12 to 18 carbon atoms, which are commercially available from Atlas Powder Company under the trademark "Tween," and particularly Tween 40, have been found to be especially satisfactory. Tween 40, the polyethylene ether of sorbitan monopalmitate appears to have the most desirable properties of pore size control for the full range of viscosity of resins which are useful for the purposes of this invention but Tween 20, 21, 60, 61, 65, 80, 81 and 85, which are the polyethylene ethers of specific and different fatty acids containing a number of carbon atoms in the range of from 12 to 18, also specifically produce satisfactory results. The best combination of resin and wetting agent is easily established by a small number of trial batches under the expected operating conditions, once the resin to be used and the desired density has been finalized. In general, the more liquid of these wetting agents at room temperature, such as Tween 20, is preferable for use with the higher viscosity resins since it enables more uniform distribution of the wetting agent throughout the resin during mixing. Similarly the higher viscosity or thicker wetting agents at room temperature generally produce somewhat better pore size control when used in conjunction with the lower viscosity resins. Other types of wetting agents such as the oleic acid esters of polyethylene glycol of molecular weight in the range of 600–1,500, and the stearic or coconut fatty acid esters of ethylene glycol of molecular weight 400–4,000, may also be used. Other surface active materials known to those skilled in the art to be compatible with phenol aldehyde resins and useful in forming cellular products therefrom may also be used.

It is not necessary that a wetting agent be present in the compositions of this invention as is above indicated by Formulation I, since satisfactory cellular materials are produced, particularly the higher density materials, e.g., heavier than about 30 lbs. per cubic ft., in the complete absence of such a material. It is, however, preferred that a wetting agent be present and a satisfactory quantity thereof is in the range of about 1% to about 4%, by weight of the resin. As the viscosity of the selected resin increases, it is generally desirable to increase the quantity of the wetting agent which is included in the composition, with the maximum indicated quantity of wetting agent being useful with resins having viscosities in excess of about 30,000 cps. Using resins having viscosities in the range of about 2,000 to 5,000 cps., no advantage has been found from the use of quantities of wetting agents exceeding about 4% by weight of the resin, and when employing resins having viscosities in the range of about 600 to about 2,000, about 1% to about 2% of wetting agent, by weight of the resin, is sufficient to produce low density cellular products having uniform pore size.

The compositions may be further modified to include additional components such as about 1%–5% antimony oxide, about 1% to about 10% amorphous carbon black, about 1%–20% graphite and about 1% to about 5% of one or more chlorinated hydrocarbons having a specific gravity in the range of about 1.2 to about 1.65, a distillation range of about 320° C. to about 400° C. and an acidity of about 0.01 to about .02 mg. of KOH/gram of chlorinated hydrocarbon, which hydrocarbons are available commercially under the trademark Aroclor, all of the above quantities being percent by weight of the aqueous resinous mass.

The below given examples are intended to illustrate in greater detail the method and compositions of this invention but it is to be understood that the specific proportions, specific materials, and conditions employed therein are set forth for illustrative purposes only.

*Example I*

A phenolic condensation product was prepared by adding to 100 parts by weight of phenol 3 parts barium hydroxide and 120 parts by weight of an aqueous formaldehyde solution, approximately 37.2% HCHO. After reaction for two hours by heating at 70° C. the product was cooled to 40° C. and neutralized by the addition of sulfuric acid. With the reaction mixture maintained between 70° C. and 80° C. the product was dehydrated, in vacuum, so that it contained less than 5% by weight of water, the resulting condensation product having a viscosity in the range of 600 to 1,000 cps. at 25° C. and being soluble in at least an equal quantity of water. This condensation product was stored at room temperature, i.e., 70° F.–90° F., and in aqueous solution form containing 58% to 62% non-volatiles is hereinafter referred to as Resin Condensate I.

A second phenolic condensation product was prepared using the same mixture of ingredients specified above, but the time of reaction was increased to produce a product, after dehydration, having a viscosity in the range of about 1500 cps.–1900 cps. at 25° C. This condensate was stored at room temperature, i.e., 70° F.–90° F. and in aqueous solution form containing 78%–81% non-volatiles is hereinafter referred to as Resin Condensate II.

A cellular material was prepared by admixing, in parts by weight, 50 parts of Resin Condensate I with 50 parts of Resin Condensate II, two parts of polyoxyethylene sorbitan monopalmitate (Tween 40) and twenty parts of $AlCl_3 \cdot 6H_2O$. To this mixed material was added, with stirring, a mixture of six parts by weight of methylene chloride and thirteen parts by weight of an aqueous acid catalyst consisting of four parts 37% HCl and nine parts of an aqueous acid solution consisting of fifty parts $H_2SO_4$ (96%), seven parts $H_3PO_4$ (65%) and fifty parts water. The material was poured into a large open top cylindrical container and after about forty-five seconds the material began to rise and after the material had set at room temperature to a solid form, the uniform textured foam was found to have a density of approximately nine lbs. per cubic ft. A portion of the foam was subjected to the direct flame from a butane torch and no flaming occurred.

*Example II*

A cellular material was prepared by adding, in parts by weight, 100 parts of Resin Condensate II, 20 parts of $AlCl_3 \cdot 6H_2O$ and 5 parts of polyoxyethylene sorbitan monopalmitate, and rapidly mixing the ingredients to a uniform consistency. To the mixture was then added, with stirring, 6 parts of methylene chloride and 13 parts of an acid catalyst consisting of 5 parts 37% HCl and 8 parts of an acid mixture consisting of 50 parts of 96% $H_2SO_4$ and 7 parts of 65% $H_3PO_4$ and 50 parts water. After being poured in a cylindrical open topped vessel, the mix began to rise after 1 minute and 24 seconds and produced a uniform textured hard cellular product having an apparent density of about 37 lbs. per cubic ft. The material resisted burning under the direct flame of a butane torch.

*Example III*

A cellular material was prepared by mixing, in parts by weight, 40 parts of Resin Condensate I with 60 parts of Resin Condensate II, 2½ parts of polyoxyethylene sorbitan monopalmitate and 20 parts of $AlCl_3 \cdot 6H_2O$. To this mixture was added, with stirring, a mixture consisting of 6 parts by weight of methylene chloride and 13 parts by weight of an acid mixture consisting of 4 parts 37% HCl and 9 parts of a second mixture consisting of 50 parts of 96% $H_2SO_4$, 50 parts water and 7 parts of 65% $H_3PO_4$. The mixed materials were poured in an open top cylindrical vessel and allowed to rise freely at room temperature and an inspection revealed a uniform textured cellular material having an apparent density of about 6 lbs. per cubic ft.

Another cellular material was prepared from an identical formulation, except that no aluminum chloride $\cdot 6H_2O$ was added in the mixture.

Six inch cubes of the two above foams were cut from the foamed materials and each cube slit centrally to form a pair of 6″ x 6″ x 3″ foam layers. A ½″ diameter steel rivet was heated in a flame to a glowing red color, in daylight, and centrally positioned in the center of one of the layers of foam from each cube sample. The other layer of the cube was immediately positioned over the hot rivet and a thermo-couple lead was positioned in the foam at a distance of 1½″ from each rivet. In this condition the samples were then constantly observed for appearance of burning. After three minutes, cracking and popping noises were heard from the sample containing no aluminum chloride and a red glow began to be visible between the two layers of foam. The thermo-couple showed the temperature to be 92° F. in the sample containing the aluminum chloride, whereas, the temperature was slightly over 300° F. in the sample containing no aluminum chloride. After 12 minutes, the sample containing no aluminum chloride, glowing red on a large portion of its surface, broke into flames and burned, whereas, the sample containing the aluminum chloride showed a temperature of 117° F. at the thermocouple and after 15 minutes showed no further rise and the test was discontinued. An inspection of the sample containing the aluminum chloride showed a red discolored circle of about 1½″ in diameter and a slight blackening immediately adjacent to the rivet, with the balance of the foam being unchanged.

*Example IV*

A series of compositions including varying proportions of aluminum chloride, wetting agent and types of acid catalyst were formulated by using the mixing procedures employed in the above examples, the mixed components allowed to free-foam and a plurality of blocks of foam from the various compositions were prepared for testing with respect to flame resistance, resistance to sustained high temperature heat and burning rate in comparison with a number of commercially available resinous foam materials. The specific compositions were prepared having the formulations set forth below in Table I, in parts by weight.

TABLE I

| Material | Foam A | Foam B | Foam C | Foam D |
|---|---|---|---|---|
| Resin Condensate I | 50 | 40 | 70 | 40 |
| Resin Condensate II | 50 | 60 | 30 | 60 |
| Methylene Chloride | 6 | 6 | 6 | 6 |
| Polyoxyethylene sorbitan monopalmitate | 1¼ | 2½ | 2 | 1½ |
| $AlCl_3 \cdot 6H_2O$ | 40 | 30 | 20 | 30 |
| Acid Catalyst I [1] | 4 | 13 | | |
| Acid Catalyst II [2] | 9 | | 13 | 13 |

[1] 37% aqueous solution HCl.
[2] 50 parts $H_2SO_4$ (96%), 50 parts $H_2O$, 7 parts $H_3PO_4$ (65%).

The cellular materials identified as Foam A, B, C and D were compared to a commercial fire-retardant polystyrene insulation board, a commercial rigid urethane board and a commercial rigid phenol formaldehyde board in three separate tests.

The first test measures the resistance of the foamed sample to sustained high temperature in an oven and was conducted in accordance with ASTM Test Specification E136–59T modified to test each sample and for weight and volume loss after ninety minutes exposure to varying temperatures until the test specimen lost 25% of its original weight and volume. The samples were positioned in the oven at 150° F. and maintained therein for ninety minutes at the end of which time they were inspected, measured and weighed and comparisons made with the original measurements. Where the weight loss was less than 25% the sample was left in the oven, the temperature raised 50° and all samples allowed to remain at the raised temperature for another ninety minute period, the process being repeated until each specimen had lost 25% of its original weight and volume, with the highest temperature reached being considered its point of failure.

The second test measured relative flammability of the foams and was conducted in accordance with the method of ASTM Test Specification D1692–59T. Briefly described, the method involves placing 4″ x 2″ x ½″ plastic specimen on a horizontal supporting wire mesh grid placed ½″ above the flame of a wing top Bunsen burner. The burner's flame was adjusted to visible portion 1½″ in height and the flame was allowed to remain under the sample until the sample had either burned for a distance of 1″ or a period of 60 seconds had elapsed. If the sample did not burn a distance of 1″ it was removed after 60 seconds and inspected, and if it did not char or burn it was considered non-burning.

The third test constitutes a somewhat more rigorous flammability test than the second test and was performed in accordance with ASTM Test Specification D757–49. In this test, a 4″ x 1″ x ½″ foam specimen was mounted in a fixture so that the sample was in contact with ⁵⁄₁₆″ diameter carbon rod electrically heated to a temperature of 1,000° C. The plastic foam sample was maintained in contact with the hot rod until a distance of 0.2″ of the sample had burned or melted away or in the absence of such burning or melting, the sample was maintained in contact with the hot rod for a period of 3 minutes, then removed and inspected.

The results of the comparative heat and flammability resistance tests for each of Foams A–D and the comparative commercial samples are set forth below in Table II.

TABLE II

| | Test I | | Test II | Test III |
|---|---|---|---|---|
| | Weight | Volume | | |
| Foam A | 75% retained at 350° F | Crumbled at 450° F | Non-burning | 7/8" charred. |
| Foam B | 64% retained at 500° F | 75% retained at 525° F | Small red glow, 1/2" charred | 15/16" charred. |
| Foam C | 80% retained at 500° F | 75% retained at 600° F | Small red glow, 1/8" charred | 1" charred. |
| Foam D | 76% retained at 500° F | Crumbled at 600° F | ...do | 7/16" charred. |
| Commercial Polystyrene, FR | Melted at 300° F | | Flamed briefly, went out; melted 1" in 22 seconds | 2 1/8" melted. |
| Rigid Urethane | 59% retained at 450° F | 75% retained at 400°F | Burned 6.3 in./min | |
| Rigid Phenol formaldehyde | Crumbled at 400° F | | Small red glow, 1 1/8" charred | 2 1/8" charred. |

Example V

A production size formulation was prepared by uniformly blending, in parts by weight, 70 parts of Resin Condensate I, 30 parts of Resin Condensate II, and 2 parts of polyoxyethylene sorbitan monopalmitate. In a separate container another mixture was prepared containing 18 parts $AlCl_3 \cdot 6H_2O$, 6 parts methylene chloride and 13 parts of an aqueous acidic mixture consisting of 50 parts of $H_2SO_4$ (96%), 50 parts water and 7 parts of $H_3PO_4$ (65%). Both components in their mixed form were aged for one hour and then blended with rapid stirring. Eighteen seconds after uniform admixture the composition began to rise and the rate of rise was fast, producing sufficient heat to cure the resin during rise and enable a vertical column to be formed from a cylindrical vessel extending approximately 2 ft. higher than the vessel, the foamed column sustaining itself without leaning or shrinking.

Example VI

A cellular material was prepared by uniformly mixing, in parts by weight, 70 parts of Resin Condensate I, 30 parts of Resin Condensate II, 1 1/2 parts of polyoxyethylene sorbitan monopalmitate and 9 parts of methylene chloride. After these materials were uniformly blended and allowed to age for about 30 minutes, 40 parts of $AlCl_3 \cdot 6H_2O$ was rapidly stirred in. After 15 minutes the material began to rise and reached a height of about 4", thereafter shrinking to about a final 3" height.

Another formulation was prepared identical in composition to the above except that 2 parts of 37% HCl was mixed with the 40 parts of aluminum chloride and the mixture added as 1 component to the resin mixture. After about 6 minutes, the material rose to about 6" in height and set without shrinkage, the foam being uniformly fine-textured.

Another composition was prepared by blending, in parts by weight, 100 parts of Resin Condensate I, 5 parts polyoxyethylene sorbitan monopalmitate, 18 parts of methylene chloride and 30 parts of $AlCl_3 \cdot 6H_2O$. Immediately after blending, the mixture was placed in an oven at 225° F. and shortly thereafter the material began to rise. Some bubbling was detected at the top skin of the rising foam column, but a substantial rise occurred and the material set at approximately its maximum height without shrinking to a self-sustaining rigid uniformly textured foam.

Example VII

A formulation was prepared containing, in parts by weight, 80 parts of Resin Condensate I, 20 parts of Resin Condensate II, 1 1/4 parts polyoxyethylene sorbitan monopalmitate and 3 parts of antimony oxide. To this blended material was added, with stirring, 6 parts of methylene chloride, 20 parts of $AlCl_3 \cdot 6H_2O$, and 13 parts of 37% HCl. After about 1 minute, foam began a slow steady rise resulting in a final foam having uniform pore size and texture which cured without shrinking.

What is claimed is:

1. A composition for forming a flame resistant, self-sustaining cellular product comprising a flowable composition including (1) an aqueous mass of the acid-curing thermosetting liquid product of partial reaction of ingredients consisting of a phenol and an aldehyde, said mass containing at least about 75% by weight of solids, (2) about 0.5% to about 24% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) about 15% to about 100% by weight of said reaction product of aluminum chloride $\cdot 6H_2O$ and (4) a catalytic amount of a mineral acid.

2. A composition for forming a flame resistant, self-sustaining cellular product comprising a flowable composition including (1) an aqueous mass of the acid-curing thermosetting liquid product of partial reaction of ingredients consisting of a phenol and an aldehyde, said mass containing at least about 75% by weight of solids, (2) about 0.5% to about 24% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) up to about 10% by weight of said reaction product of a compatible wetting agent, (4) about 15% to about 100% by weight of said reaction product of aluminum chloride $\cdot 6H_2O$, and (5) a catalytic amount of a mineral acid.

3. A composition for forming a flame resistant, self-sustaining cellular product comprising a flowable composition including (1) an aqueous mass of acid-curing thermosetting liquid product of partial reaction of ingredients consisting of a phenol and an aldehyde, said mass containing at least about 75% by weight of solids, (2) about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) from about 1% to about 4% by weight of said reaction product of a compatible wetting agent, (4) about 15% to about 50% by weight of said reaction product of aluminum chloride $\cdot 6H_2O$, and (5) a catalytic amount of a mineral acid.

4. A composition for forming a flame resistant, self-sustaining cellular product comprising a flowable composition including (1) an aqueous mass of acid-curing thermosetting liquid product of partial reaction of ingredients consisting of a phenol and an aldehyde, said mass containing at least about 75% by weight of solids, (2) about 0.5% to about 24% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) up to about 10% by weight of said reaction product of a compatible wetting agent, (4) about 20% to about 50% by weight of said reaction product of aluminum chloride·$6H_2O$, and (5) a mineral acid catalyst in an amount equivalent in heat generating capacity to about 1% to about 6% of 37% aqueous solution of HCl.

5. A method of forming a flame resistant, self-sustaining cellular product which comprises the steps of (1) forming an aqueous mass of the acid-curing thermosetting liquid condensation product by the partial reaction of ingredients consisting of a phenol and an aldehyde, said condensation product containing at least about 75% by weight of solids, (2) adding to said reaction product about 0.5 to about 24% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) about 15% to about 100% by weight of said reaction product of aluminum chloride·$6H_2O$, and (4) a catalytic amount of a mineral acid, and maintaining said mixed ingredients in a receptacle at atmospheric pressure to thereby produce a foamed cellular structure.

6. A method of forming a flame resistant, self-sustaining cellular product which comprises the steps of (1) forming an aqueous mass of acid-curing thermosetting liquid condensation product by the partial reaction of ingredients consisting of a phenol and an aldehyde, said condenastion product containing at least about 75% by weight of solids, (2) adding to said reaction product about 0.5 to about 24% by weight of said reaction product of a volatilizing agent selected from the group consisting of methylene chloride and aliphatic ethers having the formula $$ROR'$$

wherein R and R' represent an alkyl group having from 1 to 4 carbon atoms, said aliphatic ether having a boiling point in the range of about 30° C. to about 100° C., (3) up to about 10% by weight of said reaction product of a compatible wetting agent, (4) about 15% to about 100% by weight of said reaction product of aluminum chloride·$6H_2O$, and (5) a catalytic amount of a mineral acid, and maintaining said mixed ingredients in a receptacle at atmospheric pressure to thereby produce a foamed cellular structure.

7. A method of forming a flame resistant, self-sustaining cellular product which comprises the steps of (1) forming an aqueous mass of acid-curing thermosetting liquid condensation product by the partial reaction of ingredients consisting of a phenol and an aldehyde, said condensation product containing at least about 75% by weight of solids, (2) adding to said reaction product about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) from about 1% to about 4% by weight of said reaction product of a compatible wetting agent, (4) about 15% to about 50% by weight of said reaction product of aluminum chloride·$6H_2O$, and (5) a catalytic amount of a mineral acid, and maintaining said mixed ingredients in a receptacle at atmospheric pressure to thereby produce a foamed cellular product.

8. A method of forming a flame-resistant, self-sustaining cellular product which comprises the steps of (1) forming an aqueous mass of acid-curing thermosetting liquid condensation product by the partial reaction of ingredients consisting of a phenol and an aldehyde, said condensation product containing at least about 75% by weight of solids, (2) mixing with said reaction product about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) from about 1% to about 4% by weight of said reaction product of a compatible wetting agent, (4) about 20% to about 50% by weight of said reaction product of aluminum chloride·$6H_2O$, and (5) a mineral acid in an amount equivalent in heat generating capacity to about 1% to about 6% of a 37% aqueous solution of HCl, and maintaining said mixed ingredients in a receptacle to thus form a cellular product.

9. A method of forming a flame-resistant, self-sustaining cellular product which comprises the steps of (1) forming an A-stage condensation product by reacting ingredients consisting of a phenol and an aldehyde, dehydrating said condensation product to a water content not in excess of about 10% by weight, said dehydrated product being soluble in at least an equal weight of water, (2) adding about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) about 1% to about 4% of a compatible wetting agent, (4) about 15% to about 50% of said condensation product of aluminum chloride·$6H_2O$, and (5) a catalytic amount of a mineral acid, and maintaining said mixed ingredients in a receptacle at atmospheric pressure to thereby produce a foamed cellular structure.

10. A method of forming a flame-resistant, self-sustaining cellular product which comprises the steps of (1) forming an A-stage condensation product by reacting ingredients consisting of a phenol and an aldehyde, dehydrating said condensation product to a water content not in excess of about 10% by weight, said dehydrated product being soluble in at least an equal weight of water, (2) adding about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) about 1% to about 4% of a compatible wetting agent, (4) about 20% to about 50% of said condensation product of aluminum chloride·$6H_2O$, and (5) a mineral acid in an amount equivalent in heat generating capacity to about 1% to about 6% of a 37% aqueous solution of HCl.

11. A cellular flame-resistant material which is the ultimate product of reaction of a flowable composition including (1) an aqueous mass of the acid-curing thermosetting liquid product of partial reaction of ingredients consisting of a phenol and an aldehyde, said mass containing at least about 75% by weight of solids, (2) about 0.5% to about 25% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) about 15% to about 100% by weight of said reaction product of aluminum chloride·6H$_2$O, and (4) a catalytic amount of a mineral acid.

12. A cellular flame-resistant material which comprises the material obtained by the expansion of a foam forming flowable composition including (1) an aqueous mass of the acid-curing thermosetting liquid product of partial reaction of ingredients consisting of a phenol and an aldehyde, said mass containing at least about 75% by weight of solids, (2) about 0.5% to about 24% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) up to about 10% by weight of said reaction product of a compatible wetting agent, (4) about 15% to about 100% by weight of said reaction product of aluminum chloride·6H$_2$O, and (5) a catalytic amount of a mineral acid.

13. A cellular flame-resistant material which comprises the material obtained by the expansion of a foam-forming flowable composition including (1) an aqueous mass of acid-curing thermosetting liquid product of partial reaction of ingredients consisting of a phenol and an aldehyde, said mass containing at least about 75% by weight of solids, (2) about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) up to about 1% to about 4% by weight of said reaction product of a compatible wetting agent, (4) about 15% to about 50% by weight of said reaction product of aluminum chloride·6H$_2$O, and (5) a catalytic amount of a mineral acid.

14. A cellular flame-resistant material which comprises the material obtained by the expansion of a foam-forming flowable composition including (1) an aqueous mass of acid-curing thermosetting liquid product of partial reaction of ingredients consisting of a phenol and an aldehyde, said mass containing at least about 75% by weight of solids, (2) about 0.5% to about 25% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. to about 100° C., (3) up to about 10% by weight of said reaction product of a compatible wetting agent, (4) about 20% to about 50% by weight of said reaction product of aluminum chloride·6H$_2$O, and (5) a mineral acid catalyst in an amount equivalent in heat generating capacity to about 1% to about 6% of 37% aqueous solution of HCl.

15. A cellular flame-resistant material which comprises the material obtained by the expansion of a foam-forming flowable composition including (1) a liquid A-stage condensation product formed by reacting ingredients consisting of a phenol and an aldehyde, said product being dehydrated to a water content not in excess of 10% and soluble in at least an equal weight of water, (2) about 0.5% to about 24% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. and 100° C., (3) up to about 10% by weight of said reaction product of a compatible wetting agent, (4) about 15% to about 100% by weight of said reaction product of aluminum chloride·6H$_2$O, and (5) a catalytic amount of a mineral acid.

16. A cellular flame-resistant material which comprises the material obtained by the expansion of a foam-forming flowable composition including (1) a liquid A-stage condensation product formed by reacting ingredients consisting of a phenol and an aldehyde, said product being dehydrated to a water content not in excess of 10% and soluble in at least an equal weight of water, (2) about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. and 100° C., (3) from about 1 to about 4% by weight of said reaction product of a compatible wetting agent, (4) about 15% to about 50% by weight of said reaction product of aluminum chloride·6H$_2$O, and (5) a catalytic amount of a mineral acid.

17. A cellular flame-resistant material which comprises the material obtained by the expansion of a foam-forming flowable composition including (1) a liquid A-stage condensation product formed by reacting ingredients consisting of a phenol and an aldehyde, said product being dehydrated to a water content not in excess of 10% and soluble in at least an equal weight of water, (2) about 6% to about 18% by weight of said reaction product of a volatilizing agent selected from the group consisting of methylene chloride and aliphatic ethers having the formula $$ROR'$$

wherein R and R' each represent an alkyl group having from 1 to 4 carbon atoms, said aliphatic ether having a boiling point in the range of about 30° C. and 100° C., (3) from about 1% to about 4% by weight of said reaction product of a compatible wetting agent, (4) about 20% to about 50% by weight of said reaction product of aluminum chloride·6H$_2$O, and (5) a mineral acid catalyst in an amount equivalent in heat generating capacity to about 1% to about 6% of 37% aqueous solution of HCl.

(References on following page)

References Cited by the Examiner

UNITED STATES PATENTS

| | | | |
|---|---|---|---|
| 2,237,634 | 4/1941 | Rosen | 260—57 |
| 2,435,554 | 2/1948 | Coes | 260—57 |
| 2,435,555 | 2/1948 | Coes | 260—57 |
| 2,611,694 | 9/1952 | Becher | 260—57 |
| 2,650,206 | 8/1953 | Stock | 260—57 |
| 2,845,396 | 7/1958 | Krebs | 260—2.5 |
| 2,933,461 | 4/1960 | Mullen | 260—2.5 |

MURRAY TILLMAN, *Primary Examiner.*

JAMES A. SEIDLECK, *Examiner.*

M. FOELAK, *Assistant Examiner.*